United States Patent
Mimura et al.

(10) Patent No.: US 8,511,840 B2
(45) Date of Patent: Aug. 20, 2013

(54) HEXAGONAL CUBE CORNER RETROREFLECTIVE ARTICLE

(75) Inventors: Ikuo Mimura, Uozu (JP); Keiji Amemiya, Namerikawa (JP); Mitsugu Shozen, Namerikawa (JP)

(73) Assignee: Nippon Carbide Industries Co., Inc., Tokyo (JP)

( * ) Notice: Subject to any disclaimer, the term of this patent is extended or adjusted under 35 U.S.C. 154(b) by 58 days.

(21) Appl. No.: 13/318,536

(22) PCT Filed: May 10, 2010

(86) PCT No.: PCT/JP2010/057907
§ 371 (c)(1),
(2), (4) Date: Dec. 15, 2011

(87) PCT Pub. No.: WO2010/131630
PCT Pub. Date: Nov. 18, 2010

(65) Prior Publication Data
US 2012/0081787 A1    Apr. 5, 2012

(30) Foreign Application Priority Data
May 11, 2009   (JP) .................................. 2009-114170

(51) Int. Cl.
*G02B 5/124* (2006.01)
(52) U.S. Cl.
USPC ......................................................... 359/530
(58) Field of Classification Search
USPC ................................. 359/529–533
See application file for complete search history.

(56) References Cited

U.S. PATENT DOCUMENTS

| | | | |
|---|---|---|---|
| 1,591,572 | A | 7/1926 | Stimson |
| 3,417,959 | A | 12/1968 | Schultz |
| 3,458,245 | A | 7/1969 | Stanley |
| 3,922,065 | A | 11/1975 | Schultz |
| 3,924,929 | A | 12/1975 | Holmen et al. |
| 4,066,331 | A | 1/1978 | Lindner |
| 4,073,568 | A | 2/1978 | Heasley |
| 4,189,209 | A | 2/1980 | Heasley |
| 4,775,219 | A | 10/1988 | Appeldorn et al. |
| 6,010,609 | A | 1/2000 | Mimura et al. |
| 6,114,009 | A | 9/2000 | Smith |
| 6,120,280 | A | 9/2000 | Mimura et al. |
| 6,318,866 | B1 | 11/2001 | Mimura et al. |

(Continued)

FOREIGN PATENT DOCUMENTS

| | | |
|---|---|---|
| CA | 2 368 777 | 10/2000 |
| EP | 1 965 232 | 9/2008 |
| JP | 63-109233 | 7/1988 |
| WO | 20071064033 | 6/2007 |

*Primary Examiner* — Euncha Cherry
(74) *Attorney, Agent, or Firm* — Fitzpatrick, Cella, Harper & Scinto

(57) ABSTRACT

A hexagonal cube corner retroreflective article has a set of a large number of hexagonal cube corner retroreflective elements. In the retroreflective element, at least one reflective lateral face (face a, face b, and/or, face c) is divided into a pair of an upper secondary reflective lateral face (face a1, face b1, and/or face c1) and a lower secondary reflective lateral face (face a2, face b2, and/or face c2) partitioned by a line segment (EF, FD, and/or DE) connected by apexes (E, F, and/or D) constituting that reflective lateral face, in which two secondary reflective lateral faces constituting the pair of the secondary reflective lateral faces are not on the same plane. By these features the retroreflective article provides excellent observational angle characteristics.

8 Claims, 14 Drawing Sheets

(56) References Cited

U.S. PATENT DOCUMENTS 6,767,102 B1 * 7/2004 Heenan et al. ............... 359/530
2002/0141060 A1 10/2002 Lu et al.
2004/0135272 A1 7/2004 Lu et al.
2009/0161217 A1 6/2009 Mimura

* cited by examiner (5A)

(5B)

(10A)

(10B)

HEXAGONAL CUBE CORNER RETROREFLECTIVE ARTICLE

This application is a 371 of PCT Application No. PCT/JP2010/057907 filed May 10, 2010.

TECHNICAL FIELD

The present invention relates to a hexagonal cube corner retroreflective article, and more particularly to a hexagonal cube corner retroreflective article excellent in observation angle characteristics that can be preferably used in a traffic sign, a construction sign, a warning sign, a guide sign, a vehicle marking, retroreflective clothing, a reflector for an optical sensor, light gathering prism sheeting for use in a liquid crystal display device, or the like.

BACKGROUND ART

Conventionally, some proposals are made on retroreflective articles formed of hexagonal cube corner retroreflective elements having excellent retroreflective efficiency and entrance angle characteristics. However, a few techniques disclose what method is preferable for providing excellent observation angle characteristics.

For example, U.S. Pat. No. 1,591,572 (Patent Document 1) by Stimson discloses hexagonal cube corner retroreflective elements. However, there is no description as to what shapes of elements provide excellent entrance angle characteristics, observation angle characteristics, and rotation angle characteristics.

U.S. Pat. No. 3,417,959 (Patent Document 2) and U.S. Pat. No. 3,922,065 (Patent Document 4) by Schultz disclose a method (pin bundling method) of forming a prism at the tip of a metal pin and bundling a number of such pins to form a prism assembly. This method is suitable for producing relatively large prisms, but is not practical when it is necessary to form $2,000/cm^2$ or more microprisms, for example.

U.S. Pat. No. 3,458,245 (Patent Document 3) by Stanley discloses retroreflective prisms having an obtuse angle and an acute angle alternately arranged in at least two faces, or preferably four faces or more.

U.S. Pat. No. 3,924,929 (Patent Document 5) by Holmen et al. also describes a retroreflective article formed of a repeated pattern of units in which hexagonal prisms are hermetically sealed.

U.S. Pat. No. 4,066,331 (Patent Document 6) by Lindner also describes a retroreflective article in which different hexagonal prisms are arranged in each row.

U.S. Pat. No. 4,073,568 (Patent Document 7) by Heasley also describes a retroreflective article in which one kind of hexagonal prism is arranged in a repeated pattern.

Similarly, U.S. Pat. No. 4,189,209 (Patent Document 8) by Heasley also describes a retroreflective article in which two kinds of hexagonal prisms having different thickness are arranged in a repeated pattern.

U.S. Pat. No. 6,114,009 (Patent Document 9) by Smith describes a mold suitable for forming cube corner retroreflective sheeting, a method for producing the mold, and retroreflective sheeting formed using the mold, and particularly discloses a mold formed of a plurality of thin laminae and a method for producing the mold.

Japanese Utility Model Application Laid-Open No. 63-109233 (Patent Document 10) by Kato describes a reflective article formed of a first reflecting part having reflective performance with respect to an incident light beam at a critical angle or larger from the left and a second reflecting part having reflective performance with respect to an incident light beam at a critical angle or larger from the right.

U.S. Pat. No. 6,120,280 (Patent Document 11) and U.S. Pat. No. 6,010,609 (Patent Document 12) by Mimura et al. disclose a design of hexagonal cube corner retroreflective elements having an asymmetrical shape in which optical axes are tilted leftward and rightward of the elements and a method of making the element.

It is described therein that entrance angle characteristics are improved in two directions, in which the optical axes are tilted, according to such hexagonal cube corner retroreflective elements having the optical axes tilted to the right and left of the elements. However, in the elements disclosed in these patent documents, excellent improvement cannot be achieved in rotation angle characteristics.

On the other hand, U.S. Pat. No. 6,318,866 (Patent Document 13) by Mimura et al. discloses various proposals on improvement of observation angles.

Patent Document 13 discloses that observation angle characteristics can be improved by forming opposite lateral faces of a pair of triangular pyramidal cube corner retroreflective elements in different shapes.

U.S. Pat. No. 4,775,219 (Patent Document 14) by Appeldorn et al. discloses a method of improving the observation angle characteristics of a retroreflective article formed of a group of triangular pyramidal retroreflective elements.

The method of improving the observation angle disclosed in Patent Document 14 is that the angle of a V-shaped groove forming the element in three directions is changed in repeating patterns in lateral asymmetry at an angle different from the angle of the adjacent V-shaped groove, whereby forming triangular pyramidal retroreflective elements with various prism apexes.

CITATION LIST

Patent Documents

Patent Document 1: U.S. Pat. No. 1,591,572
Patent Document 2: U.S. Pat. No. 3,417,959
Patent Document 3: U.S. Pat. No. 3,458,245
Patent Document 4: U.S. Pat. No. 3,922,065
Patent Document 5: U.S. Pat. No. 3,924,929
Patent Document 6: U.S. Pat. No. 4,066,331
Patent Document 7: U.S. Pat. No. 4,073,568
Patent Document 8: U.S. Pat. No. 4,189,209
Patent Document 9: U.S. Pat. No. 6,114,009
Patent Document 10: Japanese Utility Model Application Laid-Open No. 63-109233
Patent Document 11: U.S. Pat. No. 6,120,280
Patent Document 12: U.S. Pat. No. 6,010,609
Patent Document 13: U.S. Pat. No. 6,318,866
Patent Document 14: U.S. Pat. No. 4,775,219

SUMMARY OF INVENTION

Objects to be Achieved by the Invention

As described above, although there are known some retroreflective articles with improved observation angle characteristics, retroreflective articles with more improved observation angle characteristics are demanded. Therefore, it is an object of the present invention to provide a retroreflective article using a hexagonal cube corner retroreflective element with excellent observation angle characteristics that can be preferably for use in a traffic sign or the like.

Means for Achieving the Objects

In the following, means for achieving the foregoing objects will be described in detail.

Conventionally publicly known techniques and a hexagonal cube corner retroreflective element according to the present invention refer to a cube corner retroreflective element, which is a reflector element in which three quadrilateral reflective lateral faces share one apex and three edge lines and outer circumferential edges define hexagonal projection geometry. This hexagonal cube corner retroreflective element is significantly excellent in retroreflective efficiency more than a triangular pyramidal cube corner retroreflective element preferably for use in a traffic sign or the like.

Three reflective lateral faces constituting the hexagonal cube corner retroreflective element according to the present invention are vertical to each other, forming so-called cube corner faces. However, since observation angle characteristics are improved by slightly widening a pencil of retroreflected light, preferably, a slight angle deviation is provided for faces vertical to each other to form a retroreflective element with so-called vertical angle deviation.

In triangular pyramidal cube corner retroreflective elements, various schemes are proposed for improving observation angle characteristics by providing such vertical angle deviation. However, in hexagonal cube corner retroreflective elements, there are no proposals what method provides preferable observation angle characteristics.

It is noted that the common plane of a retroreflective article according to the present invention refers to a virtual plane in parallel with a plane shared by apexes of a group of reflector elements in the same shape. Generally, the common plane can be considered to be a face matched with the incidence plane of the retroreflective article.

The optical axis in the present invention is defined as an optical center axis located at an equal distance from three reflective lateral faces. In the case where an external light beam enters the hexagonal cube corner retroreflective element in parallel with the optical axis, the hexagonal cube corner retroreflective element can obtain excellent retroreflective efficiency, whereas in the case where an external light beam enters the hexagonal cube corner retroreflective element at an angle off the optical axis, retroreflective efficiency is reduced in proportion to that angle. Thus, if the optical axis is tilted in the direction of the incident light beam beforehand, it is possible to improve retroreflective efficiency in the direction in which the optical axis is tilted.

In the hexagonal cube corner retroreflective element according to the present invention, three quadrilateral reflective lateral faces (face a, face b, and face c) share three edge lines (HD, HE, and HF) and one apex (H) with each other, and the lateral faces are defined by six outer circumferential edges (AE, EC, CD, DB, BF, and FA). The hexagonal cube corner retroreflective element according to the present invention has an optical axis passing through the apex (H) of the retroreflective element and located at an equal distance from these three reflective lateral faces (face a, face b, and face c).

In the hexagonal cube corner retroreflective element according to the present invention, at least one reflective lateral face (face a, face b, and/or, face c) partitioned by a line segment (EF, FD, and/or DE) connected by apexes (E, F, and/or D) constituting that reflective lateral face. As a result, the hexagonal cube corner retroreflective element according to the present invention is formed of six secondary reflective lateral faces, at the maximum, the six secondary reflective lateral faces each being divided into a pair of an upper secondary reflective lateral face (face a1, face b1, and/or face c1) and a lower secondary reflective lateral face (face a2, face b2, and/or face c2). It is noted that although all the reflective lateral faces are not necessarily divided into the upper secondary reflective lateral face and the lower secondary reflective lateral face, preferably, three reflective lateral faces are all divided into six secondary reflective lateral faces, in order to obtain uniform observation angle characteristics in all the orientations. In the hexagonal cube corner retroreflective element according to the present invention, two secondary reflective lateral faces (the upper secondary reflective lateral face and the lower secondary reflective lateral face), which constitute a pair of these secondary reflective lateral faces, are not on the same plane.

In other words, the hexagonal cube corner retroreflective element for use in the retroreflective article according to the present invention is a hexagonal cube corner retroreflective element, in which three quadrilateral reflective lateral faces share one apex of each of the faces, the adjacent reflective lateral faces share a single edge to form three edge lines, and six outer circumferential edges are formed of edges not shared by the adjacent reflective lateral faces in each of the reflective lateral faces. An optical axis passing through the apex shared by the three reflective lateral faces is located at an equal distance from each of the reflective lateral faces. At least one of the reflective lateral faces is divided into an upper secondary reflective lateral face and a lower secondary reflective lateral face by a line segment connecting apexes shared by only two reflective lateral faces. The upper secondary reflective lateral face and the lower secondary reflective lateral face are not on the same plane. This retroreflective article has a set of a large number of such hexagonal cube corner retroreflective elements. Preferably, the upper secondary reflective lateral face and the lower secondary reflective lateral face are not in parallel with each other.

In conventionally publicly known hexagonal cube corner retroreflective elements, in the case where light is reflected in each of three reflective lateral faces and retroreflected even though vertical angle deviation is provided for each of three reflective lateral faces, the combination of vertical angle deviation of three reflective lateral faces, on which light is reflected, is limited to one combination. Thus, the divergence of retroreflected light is restricted to simple patterns, so that it has been difficult to obtain uniform observation angle characteristics.

On the other hand, in the hexagonal cube corner retroreflective element according to the present invention, at least one reflective lateral face is formed of two secondary reflective lateral faces constituting a pair of secondary reflective lateral faces. The secondary reflective lateral faces are not on the same plane, and formed at a slightly different angle. As a result, six secondary reflective lateral faces can be provided with a different vertical angle deviation individually, so that it is possible to obtain uniform observation angle characteristics.

Namely, suppose that three reflective lateral faces are a face a, a face b, and a face c, in which for example, each of these reflective lateral faces is divided into an upper secondary reflective lateral face and a lower secondary reflective lateral face, the upper secondary reflective lateral face of the face a is a face a1, the lower secondary reflective lateral face is a face a2, the upper secondary reflective lateral face of the face b is a face b1, the lower secondary reflective lateral face is a face b1, the upper secondary reflective lateral face of the face c is a face c1, and the lower secondary reflective lateral face is a face c1. In the case where light is reflected in three reflective lateral faces and retroreflected individually, the combinations of three secondary reflective lateral faces formed of six secondary reflective lateral faces are eight kinds as shown below. On the other hand, in conventionally publicly known hexagonal cube corner retroreflective elements, the combination of the reflective lateral faces is restricted to one kind.

(1) a1, b1, c1
(2) a1, b1, c2
(3) a1, b2, c1
(4) a1, b2, c2
(5) a2, b1, c1
(6) a2, b1, c2
(7) a2, b2, c1
(8) a2, b2, c2

The hexagonal cube corner retroreflective article according to the present invention includes a set of a large number of hexagonal cube corner retroreflective elements having the secondary reflective lateral faces provided with various vertical angle deviations as described above, so that it is possible that the article has excellent observation angle characteristics in addition to excellent retroreflective efficiency of the hexagonal cube corner retroreflective element.

Preferably, the optical axis of the hexagonal cube corner retroreflective element according to the present invention is tilted at an angle ranging from 3 to 15 degrees to a perpendicular on a common plane of the retroreflective article from the apex (H) of the retroreflective element, in order to improve entrance angle characteristics.

More preferably, the optical axis of the hexagonal cube corner retroreflective element is tilted at an angle ranging from 5 to 10 degrees, in order to improve entrance angle characteristics.

In conventionally publicly known hexagonal cube corner retroreflective elements, the optical axis is not tilted and is perpendicular to the common plane, and the reflective lateral face is generally square. On the other hand, the reflective lateral face of the retroreflective element having the optical axis tilted is rectangular, and at least one of three reflective lateral faces has a shape different from the shape of the other two reflective lateral faces.

According to the present invention, also in such a hexagonal cube corner retroreflective element having the optical axis tilted, it is possible to form the retroreflective element with six secondary reflective lateral faces at the maximum, in which at least one rectangular or square reflective lateral face is partitioned by a line segment connected by the apexes constituting the reflective lateral face and the reflective lateral face is divided into a pair of an upper secondary reflective lateral face (face a1, face b1, and/or face c1) and a lower secondary reflective lateral face (face a2, face b2, and/or face c2).

Preferably, a secondary lateral face angle formed by the upper secondary reflective lateral face (face a1, face b1, and/or face c1) and the lower secondary reflective lateral face (face a2, face b2, and/or face c2), into which a single reflective lateral face of the retroreflective element according to the present invention is divided, is an angle ranging from 0.008 to 0.33 degrees. In the case where an angle between the secondary lateral faces is an angle of 0.008 degrees or more, it is possible to more sufficiently obtain the divergence of retroreflected light, and it is possible to obtain more improved observation angle characteristics. In the case where an angle between the secondary lateral faces is an angle of 0.33 degrees or less, it is preferable that the divergence of retroreflected light be not excessive and retroreflection components in the front direction be sufficiently secured. It is noted that an angle between the secondary lateral faces can be adequately adjusted depending on applications in purpose.

The secondary lateral face angle defined as an angle, which an angle formed by the secondary reflective lateral face and the common plane of the hexagonal cube corner retroreflective element according to the present invention is subtracted from 90 degrees, is formed so as to be different from the secondary lateral face angle of the corresponding reflective lateral face of the adjacent retroreflective element by an angle ranging from 0.008 to 0.33 degrees, so that it is possible to further improve observation angle characteristics.

As described above, the elements are combined to have a different secondary lateral face angle in the adjacent elements, so that it is possible to further increase the number of combinations of vertical angle deviations. Thus, the combinations of such hexagonal cube corner retroreflective elements as described above are preferable for improving observation angle characteristics.

The secondary lateral face angle is different from the secondary lateral face angle of the corresponding secondary reflective lateral face of the adjacent retroreflective element by an angle ranging from 0.008 to 0.33 degrees, and the secondary lateral face angle can be changed at regular intervals with a combination of two secondary lateral face angles or more. Such a change at regular intervals is preferable for providing uniform retroreflection performance of the retroreflective article.

In the hexagonal cube corner retroreflective element according to the present invention, a face that does not form a cube corner can be provided between the upper secondary reflective lateral face (face a1, face b1, and/or face c1) and the lower secondary reflective lateral face (face a2, face b2, and/or face c2).

Although these faces that do not form cube corners are non-retroreflective faces that do not contribute to retroreflection, the faces can control excess retroreflection. In the hexagonal cube corner retroreflective element formed with such non-retroreflective faces that do not contribute to retroreflection, it is possible to efficiently transmit luminous light from the inside in an interior lighting sign or the like, and it is possible to improve efficiency of interior lighting. All of these three non-retroreflective faces may be provided, or only one or two faces may be provided. In other words, it is possible to provide the non-retroreflective face on at least one of the reflective lateral faces, which are divided into the upper secondary reflective lateral face and the lower secondary reflective lateral face. It is also possible to provide the non-retroreflective face on all the reflective lateral faces, which are divided into the upper secondary reflective lateral face and the lower secondary reflective lateral face. It is also possible to provide the non-retroreflective face only on a part of the reflective lateral face of the reflective lateral faces, which are divided into the upper secondary reflective lateral face and the lower secondary reflective lateral face.

These non-retroreflective lateral faces may be in parallel with the common plane of the retroreflective article, or may not be in parallel the common plane. These non-retroreflective faces may be formed in a quadric surface, not a plane.

In the hexagonal cube corner retroreflective element according to the present invention, the upper secondary reflective lateral faces (face a1, face b1, and/or face c1) and/or the lower secondary reflective lateral faces (face a2, face b2, and/or face c2) can be divided into two planes or more. In other words, at least one of the upper secondary reflective lateral face and the lower secondary reflective lateral face is divided into two planes or more. It is possible to provide more uniform observation angle characteristics by a hexagonal cube corner retroreflective element like this. Preferably, the divided planes constituting the upper secondary reflective lateral face or the lower secondary reflective lateral face are not on the same plane, and more preferably, the planes are not in parallel with each other.

The secondary reflective lateral faces thus divided form a polyhedron. Preferably, an angle formed by the planes constituting the divided secondary reflective lateral faces is formed differently within an angle ranging from 0.008 to 0.33 degrees. If an angle formed by the planes constituting the divided secondary reflective lateral faces is an angle of 0.008 degrees or more, it is possible to more sufficiently obtain the divergence of retroreflected light, and it is possible to obtain more improved observation angle characteristics. In the case where the angle is an angle of 0.33 degrees or less, it is preferable that the divergence of retroreflected light be not excessive and retroreflection components in the front direction be sufficiently secured. It is noted that these angles can be adequately adjusted depending on applications in purpose.

In the retroreflective element according to the present invention, the upper secondary reflective lateral faces (face a1, face b1, and/or face c1) and/or the lower secondary reflective lateral faces (face a2, face b2, and/or face c2) can be formed in a quadric surface. In other words, at least one of the upper secondary reflective lateral face and the lower secondary reflective lateral face is formed in a quadric surface. It is possible to provide more uniform observation angle characteristics by such a hexagonal cube corner retroreflective element. It is noted that a quadric surface is formed in such a way that a straight line, which the quadric surface can draw, is a line that the line segment (EF, FD, or DE) is moved in parallel.

Preferably, the secondary reflective lateral face having such curved surface topology is formed to have an angle formed by the contact surface of the curved surface (a plane including a tangent of the curved surface) and the other secondary reflective lateral faces at an angle ranging from 0.008 to 0.33 degrees.

A method of forming the retroreflective element according to the present invention can adopt a cutting method that is a method of forming a conventionally publicly known hexagonal cube corner retroreflective element. For a base material used for cutting, copper, brass, phosphor bronze, nickel-phosphorus alloy or the like can be used for conventionally publicly known metal, and acrylic resin or the like can be used for resin. Preferably, a cutting tool used for cutting is a diamond tool.

For a preferable method in which the upper secondary reflective lateral faces and/or the lower secondary reflective lateral faces are different planes, such a method is applied in which a conventionally publicly known hexagonal cube corner retroreflective element, which the secondary reflective lateral face is not divided, is formed and then an upper secondary reflective lateral face is further cut out. By such a method, it is possible to obtain a hexagonal cube corner retroreflective element having an upper secondary reflective lateral faces and a lower secondary reflective lateral faces at different angles.

An element formed on a base material by a cutting method has a projecting shape, so that it is possible to form a more transparent retroreflective article in which the element is inverted into a recessed shape by an electroforming method and then resin is molded thereinto.

Conventionally publicly known techniques can be used, as they are, for the methods of forming the hexagonal cube corner retroreflective article, a resin preferably for use, the configuration of the hexagonal cube corner retroreflective article, or the like.

Effect of the Invention

As described above, according to the present invention, there is provided a retroreflective article using a hexagonal cube corner retroreflective element with excellent observation angle characteristics that can be preferably for use in a traffic sign or the like.

EMBODIMENT OF THE INVENTION

In the following, preferable embodiments of a hexagonal cube corner retroreflective article according to the present invention will be described with reference to the drawings.

Figure 1:
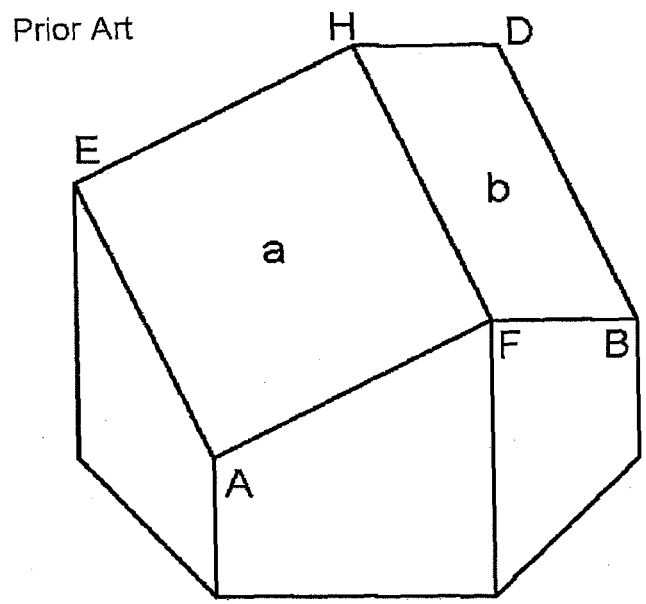
FIG. 1 is a perspective view illustrating a hexagonal cube corner retroreflective element according to a conventional technique.

FIG. 1 is a perspective view illustrating a hexagonal cube corner retroreflective element according to a conventional technique. As shown in FIG. 1, in this hexagonal cube corner retroreflective element, a face a and a face b, which are reflective lateral faces, are arranged as the faces share an apex H and an edge line (HF).

Figure 2:
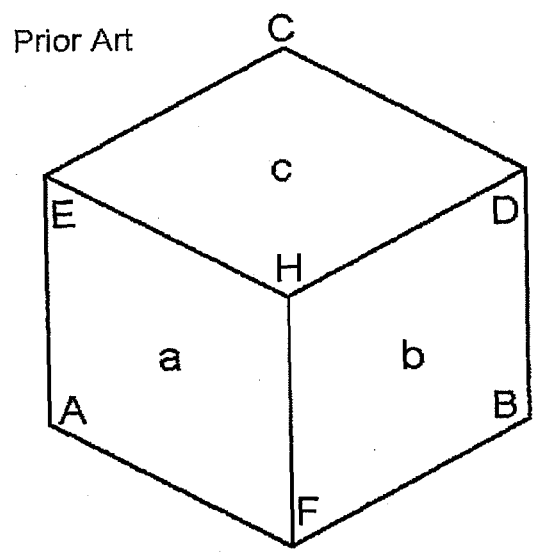
FIG. 2 is a plan view illustrating the hexagonal cube corner retroreflective element according to a conventional technique.

FIG. 2 is a plan view illustrating the hexagonal cube corner retroreflective element according to a conventional technique shown in FIG. 1. As shown in FIG. 2, in this hexagonal cube corner retroreflective element, three reflective lateral faces (face a, face b, and face c) are arranged as the faces share the apex H and three edge lines (HF, DH, and HE). The reflective lateral face (face a) is surrounded by four edges (HE, EA, AF, and FB), the reflective lateral face (face b) is surrounded by four edges (HF FB, BD, and DH), and similarly, the reflective lateral face (face c) is surrounded by four edges (HD, DC, CE, and EH).

Three reflective lateral faces (face a, face b, and face c) of the hexagonal cube corner retroreflective element shown in FIG. 2 form faces at a right angle for forming a cube corner. However, a slight deviation can be provided from perpendicularity by slightly widening retroreflected light, in order to provide observation angle characteristics. These three reflective lateral faces (face a, face b, and face c) are defined by six outer circumferential edges (AE, EC, CD, DB, BF, and FA), and the faces have hexagonal projection geometry.

Figure 3:
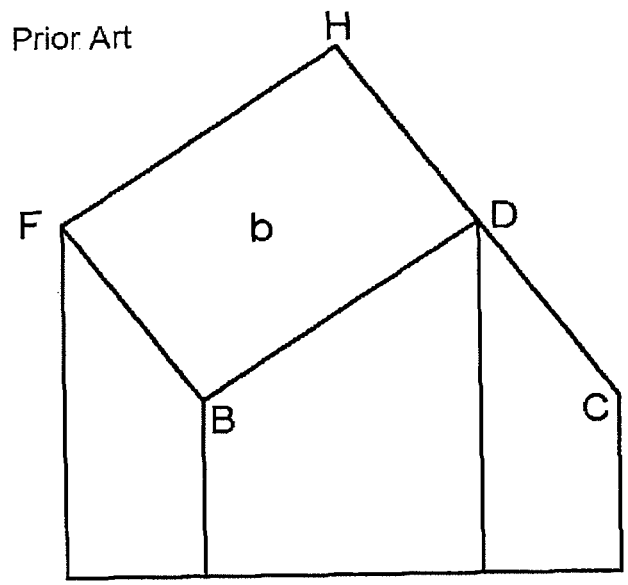
FIG. 3 is a side view illustrating the hexagonal cube corner retroreflective element according to a conventional technique.

FIG. 3 is a side view illustrating the hexagonal cube corner retroreflective element according to a conventional technique shown in FIG. 1. As shown in FIG. 3, the edge line HF forms a right angle with the lateral face (HDC) of the reflective lateral face (face c).

Figure 4:
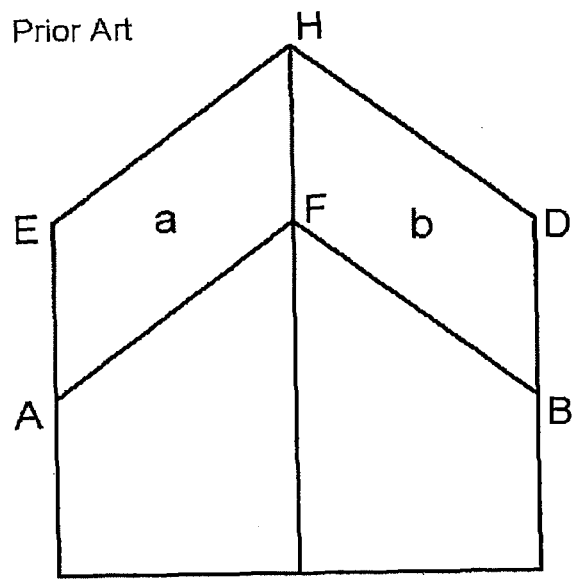
FIG. 4 is another side view illustrating the hexagonal cube corner retroreflective element according to a conventional technique.

FIG. 4 is a side view illustrating the hexagonal cube corner retroreflective element according to a conventional technique shown in FIG. 1, which is seen from another orientation.

Figure 5:
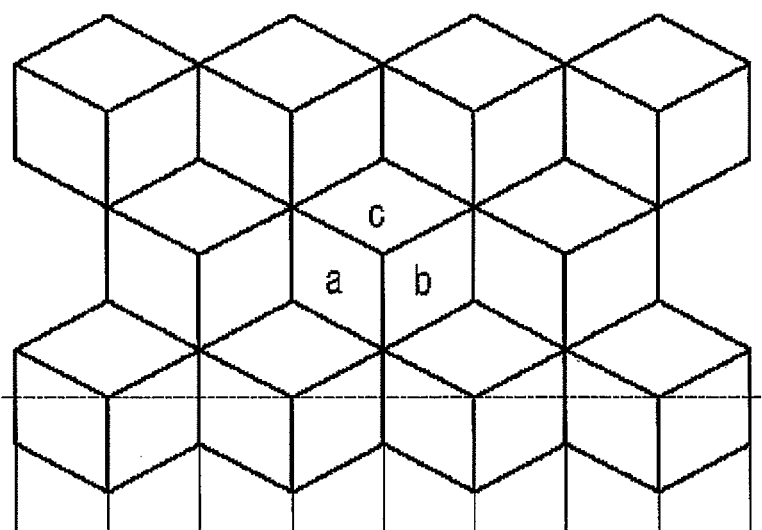
FIG. 5 is a diagram illustrating a hexagonal cube corner retroreflective article according to a conventional technique.
Figure 5:
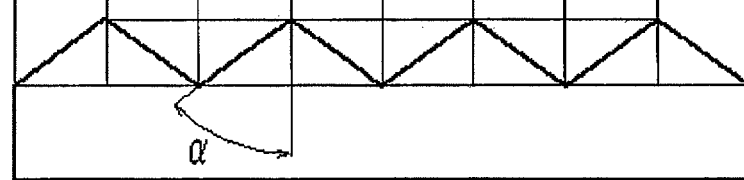

FIG. 5 is a diagram illustrating a hexagonal cube corner retroreflective article having a set of a large number of the hexagonal cube corner retroreflective elements according to a conventional technique shown in FIGS. 1 to 4 arranged in a closely packed manner. More specifically, (5A) shown in FIG. 5 shows a plan view illustrating the hexagonal cube corner retroreflective article. (5B) shown in FIG. 5 shows a cross sectional view illustrating the hexagonal cube corner retroreflective article having a set of a large number of the hexagonal cube corner retroreflective elements shown in (5A) in FIG. 5 arranged in a closely packed manner; the article is cut along a line L-L' along the apexes of the element group.

In the hexagonal cube corner retroreflective article having a set of a large number of the hexagonal cube corner retroreflective elements shown in (5A) in FIG. 5 arranged in a closely packed manner, the retroreflective elements are arranged in a closely packed manner in such a way that the adjacent retroreflective elements share six outer circumferential edges (AE, EC, CD, DB, BF, and FA) with each other.

As shown in FIG. 5 (5B), in the adjacent element groups, an angle (α) formed by the reflective lateral face and the perpendicular line from each of the apexes to the common plane of the hexagonal cube corner retroreflective article is constant. It is noted that in FIG. 5B, although only the angle (α) on the cross section of the reflective lateral face is shown, the relation of the angles is the same for an angle formed by an actual reflective lateral face and the perpendicular line.

Figure 6:
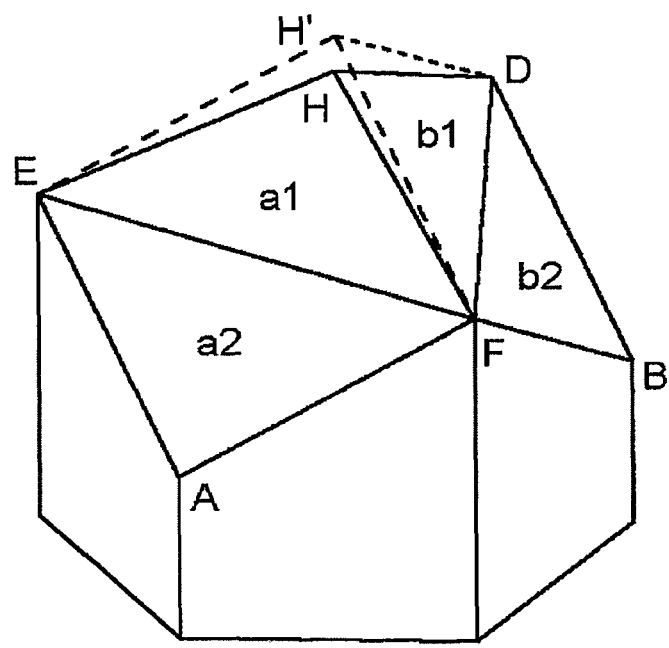
FIG. 6 is a perspective view illustrating a hexagonal cube corner retroreflective element according to the present invention.

FIG. 6 shows a perspective view illustrating a hexagonal cube corner retroreflective element according to the present invention. In FIG. 6, the conventionally publicly known hexagonal cube corner retroreflective element is illustrated by broken lines. As shown in FIG. 6, the hexagonal cube corner retroreflective element according to the present invention is formed in such a way that an apex (H) of the element has a height different from the height of an apex (H') of the conventionally publicly known hexagonal cube corner retroreflective element. In the present invention, reflective lateral faces (face a, face b, and face c) of the hexagonal cube corner retroreflective element according to a conventional technique are each divided into two reflective lateral faces by line segments (EF, FD, and DE). Namely, the reflective lateral face (face a) is divided into an upper secondary reflective lateral face (face a1) and a lower secondary reflective lateral face (face a2). Similarly, the reflective lateral face (face b) is divided into an upper secondary reflective lateral face (face b1) and a lower secondary reflective lateral face (face b2), and the reflective lateral face (face c) is divided into an upper secondary reflective lateral face (face c1) and a lower secondary reflective lateral face (face c2).

Thus, the upper secondary reflective lateral faces (face a1, face b1, and/or face c1) and the lower secondary reflective lateral faces (face a2, face b2, and/or face c2) are formed in an inclined plane with a different slope, and two secondary reflective lateral faces constituting the reflective lateral face are not on the same plane. Preferably, the combination of any three faces of these six reflective lateral faces forms a cube corner vertical to each other. The combination of the other reflective lateral faces has various deviations to perpendicular face formation, so that it is possible to obtain uniform observation angle characteristics by uniform divergence of retroreflected light.

The combination of the above-mentioned reflective lateral faces will be described more in detail. In order to retroreflect incident light, it is necessary to reflect the incident light in three reflective lateral faces vertical to each other (face a, face b, face c) according to total internal reflection or mirror reflection principles. If three reflective lateral faces are perpendicular to each other, the incident light is retroreflected toward a light source. If each of the reflective lateral faces (face a, face b, face c) has a slight vertical angle deviation from perpendicularity, the retroreflected light does not return in parallel with the incident optical axis, and the retroreflected light diverges to a degree according to the vertical angle deviation. This slight divergence contributes to improving the observation angle.

In the hexagonal cube corner retroreflective element according to the present invention, as described above, a single element can have as many as six different combinations of the secondary reflective lateral faces shown below. Namely, as shown in FIG. 6, suppose that each of three reflective lateral faces (face a, face b, face c) according to a conventional technique is divided into the upper secondary reflective lateral face (face a1, face b1, face c1) and the lower secondary reflective lateral face (face a2, face b2, face c2) in the present invention. In the case where light is reflected in three reflective lateral faces and retroreflected individually, the combinations of three secondary reflective lateral faces are eight kinds as shown below. Thus, it is possible to provide the combinations of various divergences, and it is possible to obtain preferable observation angle characteristics. On the other hand, in conventionally publicly known retroreflective elements, the combination is restricted to one combination, as described above.

(1) a1, b1, c1
(2) a1, b1, c2
(3) a1, b2, c1
(4) a1, b2, c2
(5) a2, b1, c1
(6) a2, b1, c2
(7) a2, b2, c1
(8) a2, b2, c2

In any combinations of these secondary reflective lateral faces, it is also possible to form a cube corner with a slight deviation from the relation of the faces vertical to each other, not a cube corner that forms the relation of the secondary reflective lateral faces vertical to each other. In this case, it is possible to preferably use the element for applications, which are advantageous in that retroreflected light spreads relatively widely.

Figure 7:
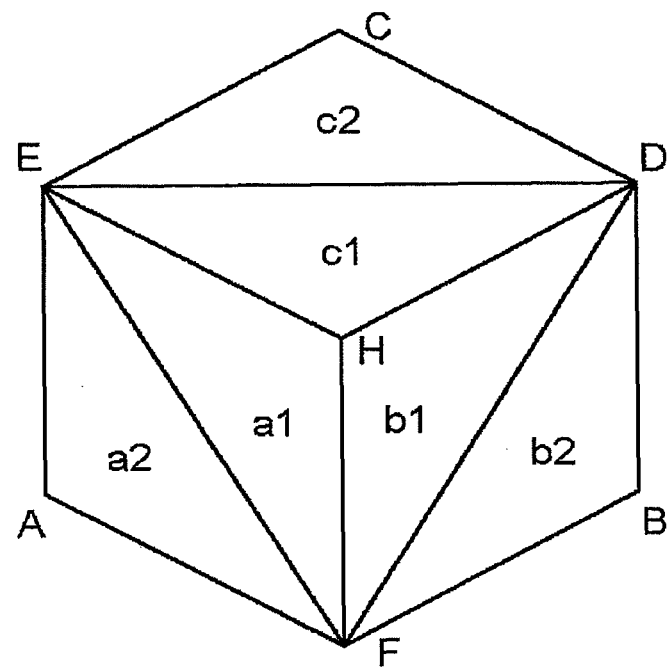
FIG. 7 is a plan view illustrating the hexagonal cube corner retroreflective element according to the present invention.

FIG. 7 shows a plan view illustrating the hexagonal cube corner retroreflective element according to the present invention shown in FIG. 6. It is illustrated that the reflective lateral faces (face a, face b, face c) formed of the upper secondary reflective lateral faces (face a1, face b1, and/or face c1) and the lower secondary reflective lateral faces (face a2, face b2, and/or face c2) are arranged as the faces share the apex H and three edge lines (HF, DH, and HE). The reflective lateral face (face a1) is surrounded by three edges (HE, EF, and FH), the reflective lateral face (face b1) is surrounded by three edges (HF, FD, and DH), and similarly, the reflective lateral face (face c1) is surrounded by three edges (HD, DE, and EH). The reflective lateral face (face a2) is surrounded by three edges (AE, EF, and FA), the reflective lateral face (face b2) is surrounded by three edges (BF, FD, and DB), and similarly, the reflective lateral face (face c2) is surrounded by three edges (CD, DE, and EC).

Figure 8:
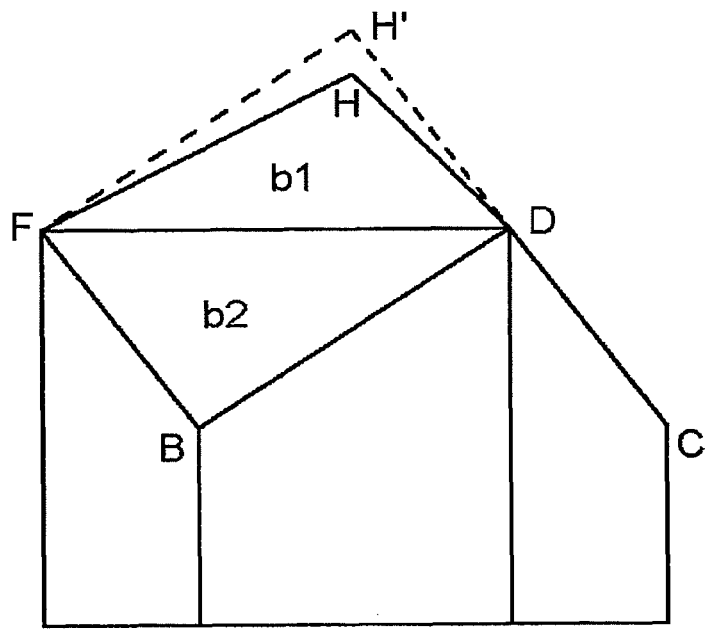
FIG. 8 is a side view illustrating the hexagonal cube corner retroreflective element according to the present invention.

FIG. 8 shows a side view illustrating the hexagonal cube corner retroreflective element according to the present invention shown in FIG. 6. It is illustrated that the apex (H) of the element is provided at a height different from the height of the apex (H') of a conventionally publicly known hexagonal cube corner element. It is also illustrated that the lateral face (HD) of the upper secondary reflective lateral face (face c1) and the lower secondary reflective lateral face (face c2) are different planes and they are not on the same plane.

Figure 9:
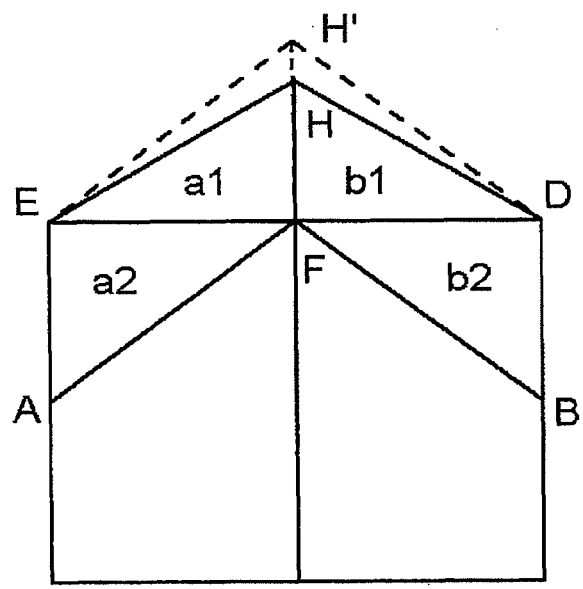
FIG. 9 is another side view illustrating the hexagonal cube corner retroreflective element according to the present invention.

FIG. 9 shows another side view illustrating the hexagonal cube corner retroreflective element according to the present invention shown in FIG. 6. It is illustrated that the apex (H) of the element is provided at a height different from the height of the apex (H') of a conventionally publicly known hexagonal cube corner element. Two upper secondary reflective lateral faces (a1, b1) are provided in such a way that the faces share the edge line (HF) and are almost vertical to each other.

Figure 10:
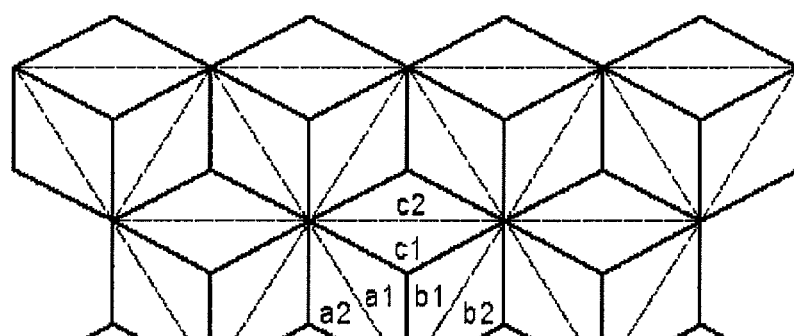
FIG. 10 is a diagram illustrating a hexagonal cube corner retroreflective article according to the present invention.
Figure 10:
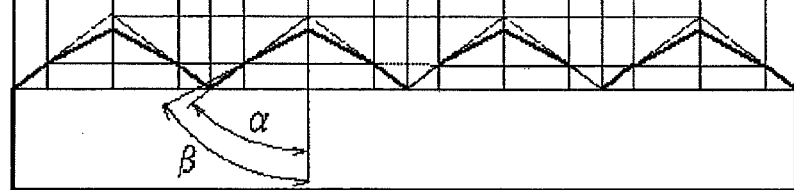

FIG. 10 is a diagram illustrating a hexagonal cube corner retroreflective article having a set of a large number of the hexagonal cube corner retroreflective elements according to the present invention shown in FIGS. 6 to 9 arranged in a closely packed manner. More specifically, (10A) shown in FIG. 10 shows a plan view illustrating the hexagonal cube corner retroreflective article, and (10B) shown in FIG. 10 shows a cross sectional view illustrating the hexagonal cube corner retroreflective article having a set of a large number of the hexagonal cube corner retroreflective elements shown in (10A) in FIG. 10 arranged in a closely packed manner; the article is cut along a line L-L' along the apexes of the element group.

As shown in (10A) in FIG. 10, in the hexagonal cube corner retroreflective article having a set of a large number of the hexagonal cube corner retroreflective elements arranged in a closely packed manner, the hexagonal cube corner retroreflective elements are arranged in a closely packed manner in such a way that the adjacent retroreflective elements share six outer circumferential edges (AE, EC, CD, DB, BF, and FA) with each other.

In any of the hexagonal cube corner retroreflective elements, the reflective lateral faces (face a, face b, face c) formed of the upper secondary reflective lateral faces (face a1, face b1, and/or face c1) and the lower secondary reflective lateral faces (face a2, face b2, and/or face c2) share the apex H and three edge lines (HF, DH, and HE), and the upper secondary reflective lateral faces (face a1, face b1, face c1) and the lower secondary reflective lateral faces (face a2, face b2, face c2) are arranged as divided by three line segments (EF, FD, and DE).

A group of these three dividing line segments (EF, FD, and DE) of the retroreflective elements adjacent to each other continue on the same line common to each other. The group of the upper secondary reflective lateral faces (face a1, face b1, and/or face c1) arranged on this same line are on the same plane.

As shown in (10B) in FIG. 10, an angle formed by the upper secondary reflective lateral face or the lower secondary reflective lateral face of the adjacent element groups and the perpendicular line from each of the apexes to the common plane of the retroreflective article is different.

Although only angle components of the reflective lateral faces in the cross sectional direction are shown in (10B) in FIG. 10, the relation of the angles is the same for an angle formed by the actual reflective lateral face and the perpendicular line.

Figure 11:
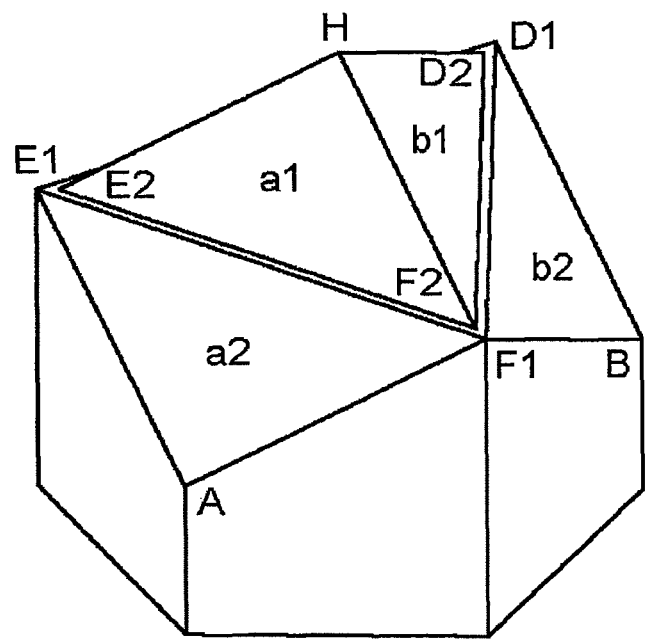
FIG. 11 is a perspective view illustrating a hexagonal cube corner retroreflective element according to the present invention.

FIG. 11 shows the form of another hexagonal cube corner retroreflective element according to the present invention. In this hexagonal cube corner retroreflective element, another face (E1E2F2F1, F1F2D2D1, and D1D2E2E1) is provided between an upper secondary reflective lateral face (face a1, face b1, and/or face c1) and a lower secondary reflective lateral face (face a2, face b2, and/or face c2) to partition the upper and lower secondary reflective lateral faces.

These faces (E1E2F2F1, F1F2D2D1, and D1D2E2E1) are non-retroreflective faces that do not contribute to retroreflection, and can control excess retroreflection. In an interior lighting sign or the like, it is possible to transmit luminous light from the inside, and it is possible to improve efficiency of interior lighting. All of these three non-retroreflective faces may be provided, or only one or two faces may be provided.

These non-retroreflective lateral faces may be in parallel with the common plane of the retroreflective article, or may not be in parallel the common plane. These non-retroreflective faces may be formed in a quadric surface, not in a plane.

Figure 12:
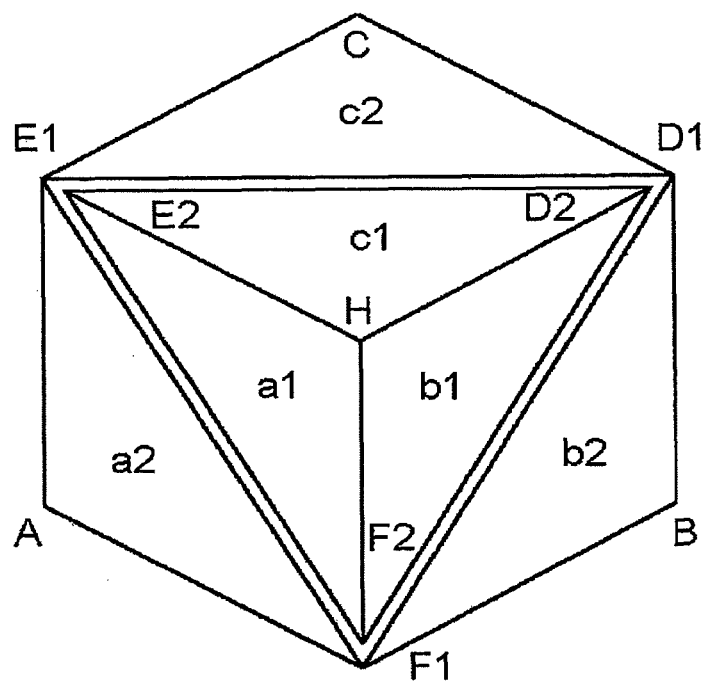
FIG. 12 is a plan view illustrating the hexagonal cube corner retroreflective element according to the present invention.

FIG. 12 shows a plan view illustrating the hexagonal cube corner retroreflective element according to the present invention shown in FIG. 11. Reflective lateral faces (face a, face b, face c) formed of the upper secondary reflective lateral faces (face a1, face b1, and/or face c1) and the lower secondary reflective lateral faces (face a2, face b2, and/or face c2) are arranged as the faces share the apex H and three edge lines (HF, DH, and HE). The upper secondary reflective lateral face (face a1) is surrounded by three edges (HE, EF, and FH), the upper secondary reflective lateral face (face b1) is surrounded by three edges (HF, FD, and DH), and similarly, the upper secondary reflective lateral face (face c1) is surrounded by three edges (HD, DE, and EH). The lower secondary reflective lateral face (face a2) is surrounded by three edges (AE, EF, and FA), the lower secondary reflective lateral face (face b2) is surrounded by three edges (BF, FD, and DB), and similarly, the lower secondary reflective lateral face (face c2) is surrounded by three edges (CD, DE, and EC). These upper secondary reflective lateral faces and these lower secondary reflective lateral faces are partitioned by the non-retroreflective lateral faces (E1E2F2F1, F1F2D2D1, and D1D2E2E1).

Figure 13:
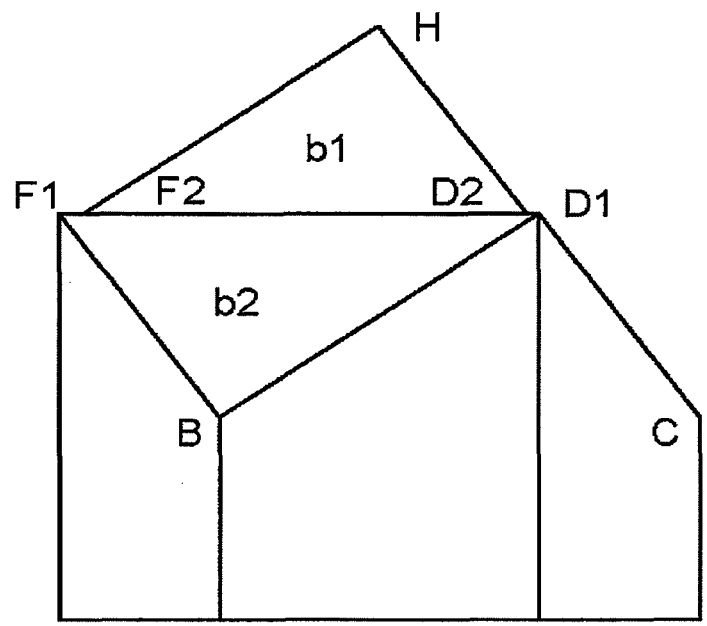
FIG. 13 is a side view illustrating the hexagonal cube corner retroreflective element according to the present invention.

FIG. 13 shows a side view illustrating the hexagonal cube corner retroreflective element according to the present invention shown in FIG. 11. It is illustrated that the upper secondary reflective lateral face (face c1) indicated by HD2 and the lower secondary reflective lateral face (face c2) indicated by a straight line D1C are different planes, and are not on the same plane. The upper secondary reflective lateral face and the lower secondary reflective lateral face partitioned by the non-retroreflective face may be faces that are not on the same plane but in parallel with each other as described above, or may be faces that are not in parallel with each other.

Figure 14:
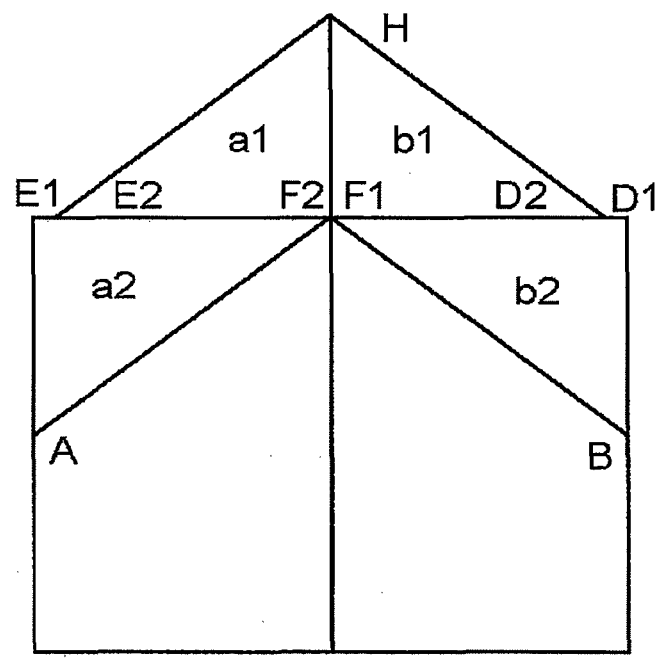
FIG. 14 is another side view illustrating the hexagonal cube corner retroreflective element according to the present invention.

FIG. 14 shows another side view illustrating the hexagonal cube corner retroreflective element according to the present invention shown in FIG. 11. Two upper secondary reflective lateral faces (face a1, face b1) are provided in such a way that the faces share an edge line (HF2) and are almost vertical to each other.

Figure 15:
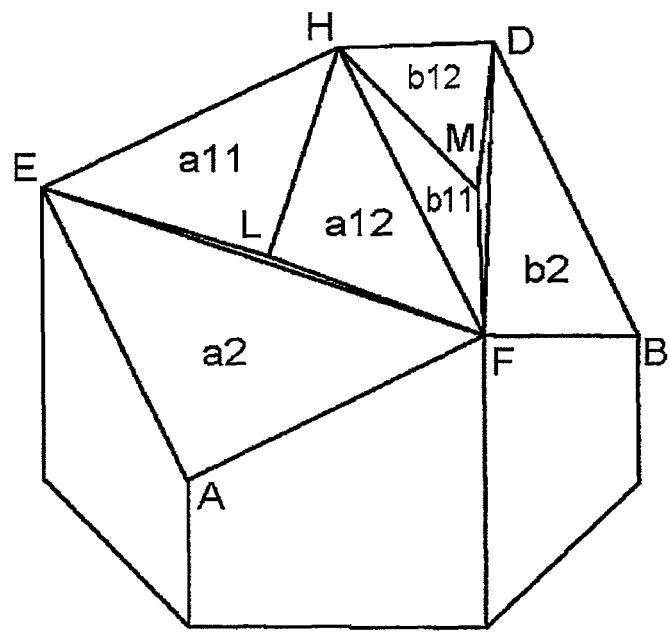
FIG. 15 is a perspective view illustrating a hexagonal cube corner retroreflective element according to the present invention.

FIG. 15 shows a perspective view illustrative of the form of still another hexagonal cube corner retroreflective element according to the present invention. Upper secondary reflective lateral faces of the retroreflective element shown in FIG. 15 are each further divided into two upper secondary reflective lateral faces (face a11, face a12, face b11, face b12, face c11, and face c12). A non-retroreflective lateral face (FLF, FMD, and DKE) is provided between two upper secondary reflective lateral faces and a lower secondary reflective lateral face (face a2, face b2, and/or face c2), and the upper secondary reflective lateral faces (face a11, face a12, face b11, face b12, face c11, face c12) and the lower secondary reflective lateral face (face a2, face b2, face c2) are partitioned by the non-retroreflective lateral face (FLF, FMD, DKE).

An apex (H) of the hexagonal cube corner retroreflective element shown in FIG. 15 is formed in such a way that the apex (H) has the same height as the apex of a conventionally publicly known hexagonal cube corner retroreflective element, or has a height different from the height of the conventional element. The upper secondary reflective lateral faces of the hexagonal cube corner retroreflective element are each divided into two upper secondary reflective lateral faces (face a11, face a12, face b11, face b12, face c11, and face c12) by line segments (HL, HM, and HK).

Thus, the upper secondary reflective lateral faces (face a11, face a12, face b11, face b12, face c11, and face c12) are formed in an inclined plane with a different slope, and two of the upper secondary reflective lateral faces (face a11, face a12, face b11, face b12, face c11, and face c12) and the lower secondary reflective lateral faces (face a2, face b2, and/or face c2) constituting the secondary reflective lateral face group are not on the same plane. Preferably, the combination of any three faces of these nine reflective lateral faces forms a cube corner vertical to each other. The combination of the other reflective lateral faces has various deviations to perpendicular face formation, so that it is possible to obtain uniform observation angle characteristics by uniform divergence of retroreflected light.

The combination of the above-mentioned reflective lateral faces will be described more in detail. In order to retroreflect incident light, it is necessary to reflect the light in three reflective lateral faces vertical to each other according to total internal reflection or mirror reflection principles. If three reflective lateral faces are vertical to each other, the incident light is retroreflected toward a light source. If each of the reflective lateral faces has a slight vertical angle deviation to perpendicularity, the retroreflected light does not return in parallel with the incident optical axis, and the retroreflected light diverges to a degree according to the vertical angle deviation. This slight divergence contributes to improving the observation angle.

In the hexagonal cube corner retroreflective element according to the present invention, as described above, a single element can have as many as 27 different combinations of the reflective lateral faces shown below. Thus, according to a hexagonal cube corner retroreflective element like this, it is possible to provide combinations to cause various divergences, and it is possible to obtain preferable observation angle characteristics. On the other hand, in conventionally publicly known retroreflective elements, the combination is restricted to one combination. Namely, as shown in FIG. 15, suppose that each of three reflective lateral faces (face a, face b, face c) is divided into the upper secondary reflective lateral faces (face a1, face b1, face c1) and the lower secondary reflective lateral faces (face a2, face b2, face c2), the upper secondary reflective lateral face (face a1) is divided into two planes (face a11, face a12), the upper secondary reflective lateral face (face b1) is divided into two planes (face b11, face b12), and the upper secondary reflective lateral face (face c1) is divided into two planes (face c11, face c12). In the case where light is reflected in three reflective lateral faces and retroreflected individually, the combinations of three secondary reflective lateral faces are 27 kinds as described below.

The secondary reflective lateral faces can take 27 different combinations.

(1) a11, b11, c11
(2) a11, b11, c12
(3) a11, b11, c2
(4) a11, b12, c11
(5) a11, b12, c12
(6) a11, b12, c2
(7) a11, b2, c11
(8) a11, b2, c12
(9) a11, b2, c2
(10) a12, b11, c11
(11) a12, b11, c12
(12) a12, b11, c2
(13) a12, b12, c11
(14) a12, b12, c12
(15) a12, b12, c2
(16) a12, b2, 11
(17) a12, b2, c12
(18) a12, b2, c2
(19) a2, b11, c11
(20) a2, b11, c12
(21) a2, b11, c2
(22) a2, b12, c11
(23) a2, b12, c12
(24) a2, b12, c2
(25) a2, b2, c11
(26) a2, b2, c12
(27) a2, b2, c2

In any combinations of these secondary reflective lateral faces, it is also possible to form a cube corner with a slight deviation from the relation of the faces vertical to each other, not a cube corner that forms the relation of the secondary reflective lateral faces vertical to each other. In this case, it is possible to preferably use the element for applications, which are advantageous in that retroreflected light spreads relatively widely.

It is also possible that the upper secondary reflective lateral face is divided into three secondary reflective lateral faces or more, not two secondary reflective lateral faces. Such a hexagonal cube corner retroreflective element having secondary reflective lateral faces divided into three or more is possible to provide more excellent observation angle characteristics.

Figure 16:
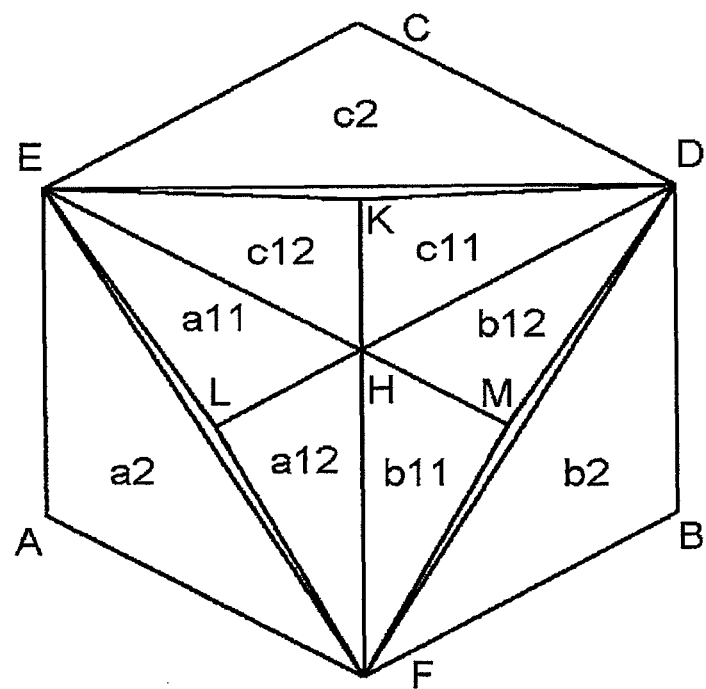
FIG. 16 is a plan view illustrating the hexagonal cube corner retroreflective element according to the present invention.

FIG. 16 shows a plan view illustrating the hexagonal cube corner retroreflective element according to the present invention shown in FIG. 15. As shown in FIG. 16, the retroreflective element is formed of two of the upper secondary reflective lateral faces (face a11, face a12, face b11, face b12, face c11, and face c12) and the lower secondary reflective lateral faces (face a2, face b2, and/or face c2). The non-retroreflective lateral face (FLF, FMD, and DKE) is provided between the upper secondary reflective lateral faces (face a11, face a12, face b11, face b12, face c11, and face c12) and the lower secondary reflective lateral face (face a2, face b2, and/or face c2).

Figure 17:
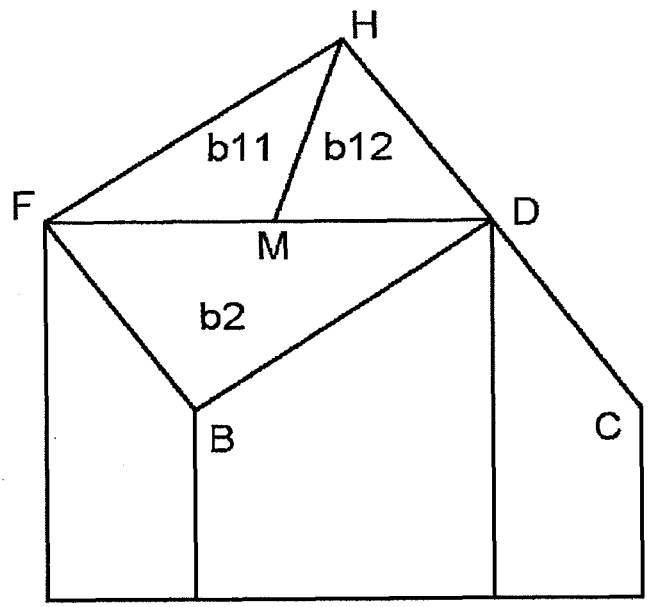
FIG. 17 is a side view illustrating the hexagonal cube corner retroreflective element according to the present invention.
Figure 18:
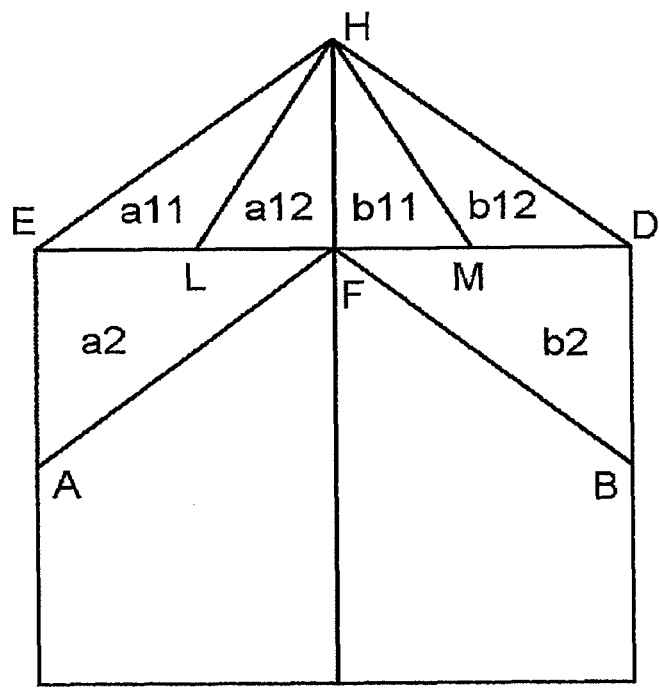
FIG. 18 is another side view illustrating the hexagonal cube corner retroreflective element according to the present invention.

FIGS. 17 and 18 show side views illustrating the hexagonal cube corner retroreflective element according to the present invention shown in FIG. 15.

Figure 19:
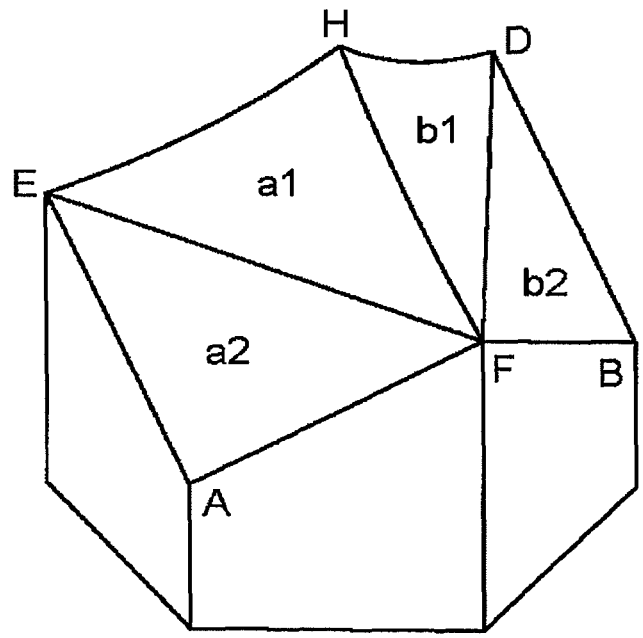
FIG. 19 is a perspective view illustrating a hexagonal cube corner retroreflective element according to the present invention.

FIG. 19 shows a perspective view illustrating yet another hexagonal cube corner retroreflective element according to the present invention. Reflective lateral faces of this retroreflective element are each divided into two reflective lateral faces, i.e. upper secondary reflective lateral faces (face a1, face b1, and/or face c1) and lower secondary reflective lateral faces (face a2, face b2, and/or face c2) by line segments (EF, FD, and DE), and the upper secondary reflective lateral faces are formed in a quadric surface or a cubic surface along the line segments (EF, FD, and DE). It is also possible that an apex (H) of the retroreflective element shown in FIG. 19 is formed to have a height different from the height of the apex of a conventionally publicly known hexagonal cube corner retroreflective element or the same height of the conventional element.

As described above, such a retroreflective element that the upper secondary reflective lateral faces are formed in a quadric surface or a cubic surface is preferable because the retroreflective element can provide uniform observation angle characteristics.

Figure 20:
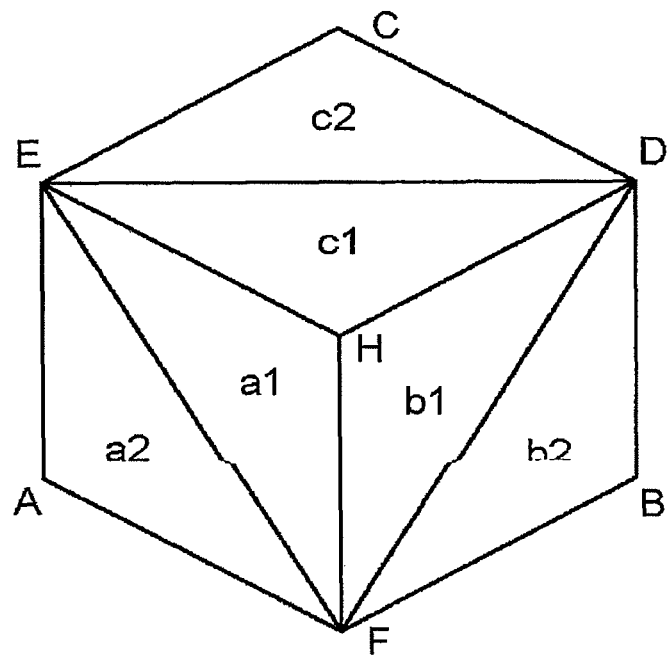
FIG. 20 is a plan view illustrating the hexagonal cube corner retroreflective element according to the present invention.

FIG. 20 shows a plan view illustrating the hexagonal cube corner retroreflective element having a curved surface according to the present invention shown in FIG. 19. The upper secondary reflective lateral faces (face a1, face b1, and/or face c1) shown in the drawing are formed in a quadric surface along the line segments (EF, FD, and DE).

Figure 21:
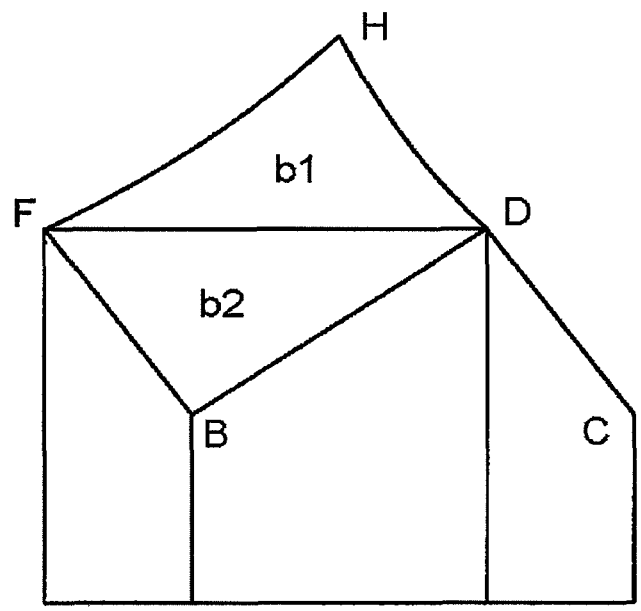
FIG. 21 is a side view illustrating the hexagonal cube corner retroreflective element according to the present invention.
Figure 22:
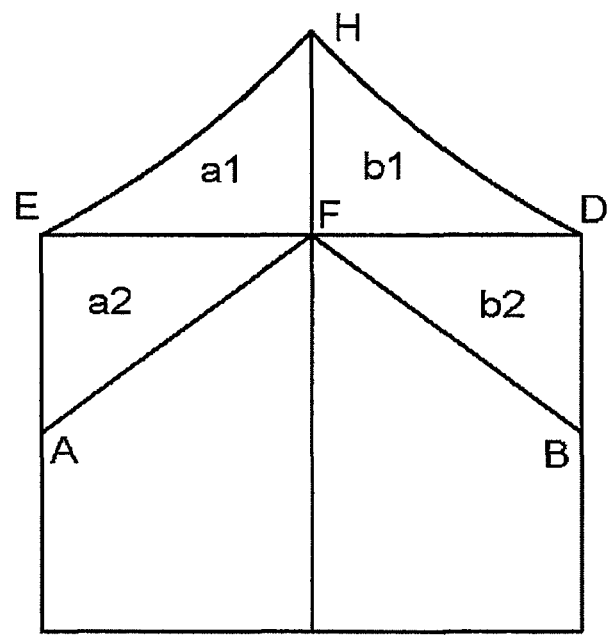
FIG. 22 is another side view illustrating the hexagonal cube corner retroreflective element according to the present invention.

FIGS. 21 and 22 show side views illustrating the hexagonal cube corner retroreflective element according to the present invention shown in FIG. 19.

Figure 23:
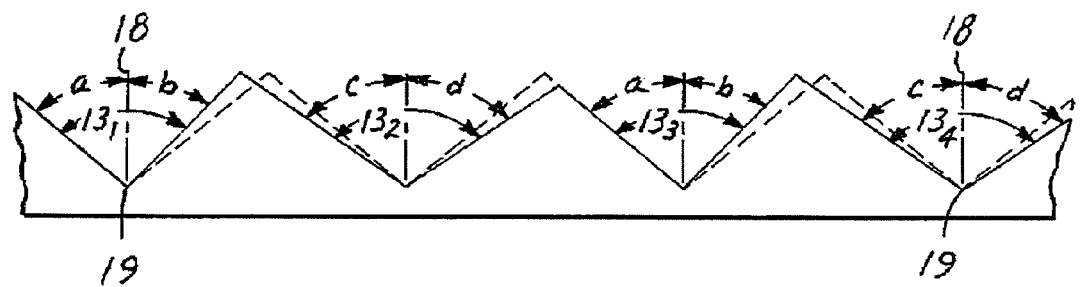
FIG. 23 is a principle diagram illustrating a scheme for improving observation angle characteristics by a triangular pyramidal cube corner retroreflective element according to a conventional technique.

FIG. 23 shows a principle diagram illustrating a scheme of providing various vertical angle deviations for improving the observation angle characteristics of a retroreflective article formed of a group of triangular pyramidal retroreflective elements according to a conventional technique. This scheme is disclosed in detail as a method of improving observation angle characteristics in U.S. Pat. No. 4,775,219 (Patent Document 14) by Appeldorn et al.

The method of improving the observation angle disclosed in Patent Document 14 is that the angle of a V-shaped groove forming the element in three directions is changed in repeating patterns in lateral asymmetry at an angle different from the angle of the adjacent V-shaped groove, whereby forming triangular pyramidal retroreflective elements with various prism apexes.

In the following, a method of improving observation angle characteristics according to the present invention will be shown with reference to FIG. 24.

Figure 24:
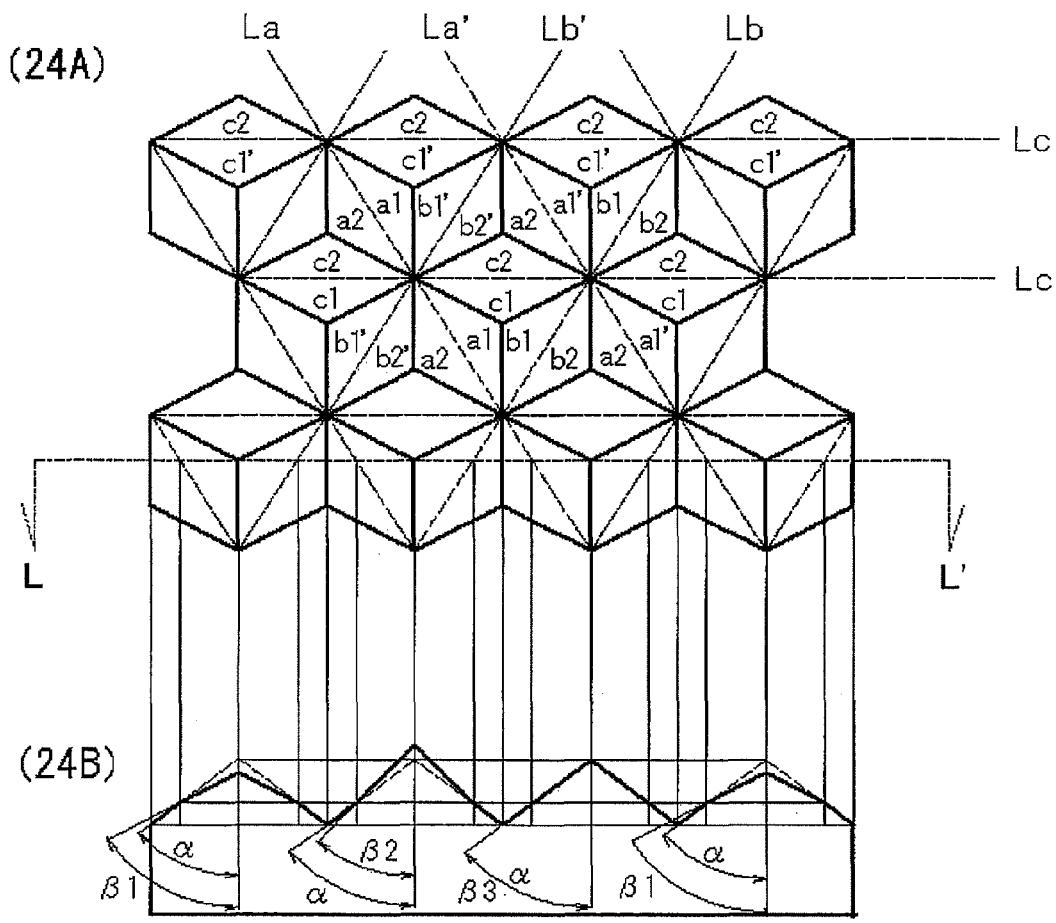
FIG. 24 is a diagram illustrating a hexagonal cube corner retroreflective article according to the present invention.

FIG. 24 is a diagram illustrating a hexagonal cube corner retroreflective article having a large number of yet another hexagonal cube corner retroreflective elements according to the present invention arranged in a closely packed manner. More specifically, (24A) shown in FIG. 24 shows a plan view illustrating the hexagonal cube corner retroreflective article. (24B) shown in FIG. 24 shows a cross sectional view illustrating the hexagonal cube corner retroreflective article having a set of a large number of the hexagonal cube corner retroreflective elements (24A) shown in FIG. 24 arranged in a closely packed manner; the article is cut along a line L-L' along the apexes of the element group.

As shown in (24A) in FIG. 24, in the hexagonal cube corner retroreflective article having a set of a large number of the hexagonal cube corner retroreflective elements, a large number of the hexagonal cube corner retroreflective elements are arranged in a closely packed manner in such a way that the adjacent retroreflective elements share six outer circumferential edges (AE, EC, CD, DB, BF, and FA) with each other.

In any of the hexagonal cube corner retroreflective elements, the reflective lateral faces (face a, face b, face c) formed of the upper secondary reflective lateral faces (face a1, face b1, and/or face c1) and the lower secondary reflective lateral faces (face a2, face b2, and/or face c2) share the apex H and three edge lines (HF, DH, and HE), and arranged as divided by three dividing line segments (EF, FD, and DE).

A group of these three dividing line segments (EF, FD, DE) of the retroreflective elements adjacent to each other is continued and arranged on the same line (La, Lb, Lc) common to each other. The group of the upper secondary reflective lateral faces (face a1, face b1, and/or face c1) arranged on the same line (La, Lb, Lc) is on the same plane, and the faces form the same secondary lateral face angle ($\beta1$, $\beta2$, and/or $\beta3$).

As shown in (24B) in FIG. 24, an angle formed by the upper secondary reflective lateral face or the lower secondary reflective lateral face of the retroreflective element and the perpendicular line from each of the apexes to the common plane of the retroreflective article is different.

In the hexagonal cube corner retroreflective article shown in FIG. 24, a secondary lateral face angle ($\beta$) formed by the group of the upper secondary reflective lateral faces (face a1, face b1, and/or face c1) of the hexagonal cube corner retroreflective element is different from the secondary lateral face angle of the adjacent upper secondary reflective lateral face, and this secondary lateral face angle ($\beta$) is changed at regular intervals with the combinations of two elements or more.

Namely, in FIG. 23B, the secondary lateral face angles of the upper secondary reflective lateral face (a1) and the lower secondary reflective lateral face (a2) of a retroreflective element at the left end are angles $\beta1$ and $\alpha$, and the angle $\beta1$ is larger than the angle $\alpha$. The secondary lateral face angles of a retroreflective element at the second left end are an angle $\beta2$ and the angle $\alpha$, and the angle $\beta2$ is smaller than the angle $\alpha$. The secondary lateral face angles of a retroreflective element at the third left end are an angle $\beta3$ and the angle $\alpha$, and the angle $\beta3$ is the same as the angle $\alpha$. The retroreflective element having these three kinds of secondary lateral face angles is repeatedly formed at regular intervals.

The upper secondary reflective lateral faces with such periodicity are also preferable for obtaining uniform observation angle characteristics in any direction of the reflective lateral faces (a1, b1, c1).

In FIG. 24B, although only angle components of the reflective lateral faces in the cross sectional direction are shown, the same thing is applied to an actual angle formed by the actual reflective lateral face and the perpendicular line.

In FIG. 24, only the secondary lateral face angle formed by the upper secondary reflective lateral faces (face a1, face b1, and/or face c1) is changed at regular intervals. However, it is also possible to change a secondary lateral face angle formed by the lower secondary reflective lateral faces (face a2, face b2, and/or face c2) at regular intervals.

EXAMPLES

In the following, the detail of the present invention will be described more specifically according to examples. It is without saying that the present invention is not limited only to the examples.

Coefficient of Retroreflection

Coefficients of retroreflection described in the present specification including the examples were measured according to a method described below. For a retroreflectometer, "Model 920" manufactured by Gamma Scientific Inc. was used. Coefficients of retroreflection of a retroreflective sheeting of 100 mm×100 mm were measured at five appropriate places on a sample under the angle conditions that the observation angle was angles of 0.2° and 1.0° and the entrance angle was angles of 5° and 30°, according to ASTM E810-91. The mean value of the coefficients of retroreflection was the coefficient of retroreflection of the retroreflective sheeting.

Comparative Example

A brass die was formed, in which a large number of hexagonal cube corner retroreflective elements were arranged, using a fly-cutting method in such a way that a height (h) of the element was 100 μm, the elements being a normal hexagonal cube corner retroreflective element with no slope of the optical axis.

A hexagonal cube corner molding die was formed using this brass mother die by an electroforming method with nickel sulfamate solution having a concentration of 55%, the molding die having a material of nickel in a recessed shape in which the shape was inverted. A polycarbonate resin sheet having a thickness of 200 μm ("Iupilon H3000" manufactured by Mitsubishi Engineering-Plastics Co.) was compression-molded using this molding die, under the conditions that a molding temperature was a temperature of 200° C. and a molding pressure was 50 kg/cm². The resin sheet was cooled to a temperature of 30° C. under pressure, and then the resin sheet was taken out. A polycarbonate resin retroreflective article (a comparative article) was formed in which a large number of hexagonal cube corner retroreflective elements were arranged in a closely packed manner on the surface.

The shape of the retroreflective element has projection geometry of the base in a regular hexagon (AFBDCE) as shown in FIGS. 1 to 5, and a group of these retroreflective elements is located on a virtual common plane in parallel with a plane including the apex of each retroreflective element.

A hexagonal cube corner element to form the comparative article has a shape in which the height from an apex (H) to a bottom (A, B, and C) of a reflective lateral face is 80.0 μm, the reflective lateral face is square that the length of an edge is 69.2 μm, the length of a diagonal line (EF, FD, and DE) of the reflective lateral face is 97.96 μm, and the slope of the optical axis is zero degree.

The secondary lateral face angle defined as an angle, which an angle formed by each of reflective lateral faces (face a, face b, and face c) and the common plane is subtracted from an angle of 90 degrees, is equally formed at an angle of 35.26°.

Example 1

A hexagonal cube corner retroreflective article (an inventive article 1) according to the present invention as shown in FIGS. 6 to 10 was formed by a forming method the same as the method described in the comparative example.

A hexagonal cube corner retroreflective element to form the inventive article has a shape in which the height from an apex (H) to a bottom (A, B, and C) of a reflective lateral face is 80 μm, six secondary reflective lateral faces have a rectangular equilateral triangle, the length of edges (AE, AF, BF, BD, CD, and CE) of a lower secondary reflective lateral face (face a2, face b2, and face c2) is 69.2 μm, the length of the other edges (EF, FD, and DE) is 97.96 μm, and the slope of an optical axis is zero degree.

A secondary lateral face angle defined as an angle, which an angle formed by each of the lower secondary reflective lateral faces (face a2, face b2, and face c2) and a common plane is subtracted from 90 degrees, is equally formed at an angle of 35.26°.

A secondary lateral face angle defined as an angle, which an angle formed by each of upper secondary reflective lateral faces (face a1, face b1, and face c1) and a common plane is subtracted from 90 degrees, is each formed at an angle of 0.167 degrees (10 minutes) smaller than a theoretical value of 35.26° of the normal retroreflective element, and the secondary lateral face angle is an angle of 35.10 degrees.

Example 2

A hexagonal cube corner retroreflective article (an inventive article 2) according to the present invention as shown in FIG. 24 was formed by a forming method the same as the method described in the comparative example.

A hexagonal cube corner retroreflective element to form the inventive article 2 has a shape in which the height from an apex (H) to a bottom (A, B, and C) of a reflective lateral face is 80 μm, and six secondary reflective lateral faces have a rectangular equilateral triangle.

The length of edges (AE, AF, BF, BD, CD, and CE) of a lower secondary reflective lateral face (face a2, face b2, and face c2) is 69.2 μm, the length of the other edges (EF, FD, and DE) is 97.96 μm, and the slope of an optical axis is zero degree.

A secondary lateral face angle defined as an angle, which an angle formed by each of the lower secondary reflective lateral faces (face a2, face b2, and face c2) and a common plane is subtracted from 90 degrees, is equally formed at an angle of 35.26°.

In the inventive article 2, first upper secondary reflective lateral faces (face a1, face b1, and face c1) having two kinds of secondary lateral face angles and second lower secondary reflective lateral faces (face a1', face b1', and face c1') are formed alternately.

A secondary lateral face angle defined as an angle, which an angle formed by the first upper secondary reflective lateral face (face a1, face b1, and face c1) and a common plane is subtracted from 90 degrees, is each formed at an angle of 0.083 degrees (5 minutes) smaller than a theoretical value of 35.26° of the normal retroreflective element, and the secondary lateral face angle is an angle of 35.18 degrees.

A secondary lateral face angle defined as an angle, which an angle formed by a second upper secondary reflective lateral face (face a1, face b1, and face c1) and a common plane is subtracted from 90 degrees, is each formed at an angle of 0.25 degrees (15 minutes) smaller than a theoretical value of 35.26° of the normal retroreflective element, and the secondary lateral face angle is an angle of 35.01 degrees.

Table 1 shows coefficients of retroreflection (Ra) of the comparative article in the observation angle (Obs.) and the entrance angle (Ent.), Table 2 shows coefficients of retroreflection of the inventive article 1, and Table 3 shows coefficients of retroreflection of the inventive article 2.

Any of the inventive articles had excellent observation angle characteristics under any of the entrance angle conditions as compared with the comparative article formed of conventionally publicly known hexagonal cube corner retroreflective elements.

TABLE 1

| Obs. | Ent. | Ra |
| --- | --- | --- |
| 0.2° | 5° | 1,340 |
| 0.2° | 30° | 930 |
| 1.0° | 5° | 410 |
| 1.0° | 30° | 85 |

TABLE 2

| Obs. | Ent. | Ra |
| --- | --- | --- |
| 0.2° | 5° | 870 |
| 0.2° | 30° | 645 |
| 1.0° | 5° | 370 |
| 1.0° | 30° | 241 |

TABLE 3

| Obs. | Ent. | Ra |
| --- | --- | --- |
| 0.2° | 5° | 750 |
| 0.2° | 30° | 603 |
| 1.0° | 5° | 427 |
| 1.0° | 30° | 360 |

INDUSTRIAL APPLICABILITY

The retroreflective article according to the present invention is an retroreflective article preferably for use in specific applications including a traffic sign, a construction sign, a warning sign, a guide sign, a vehicle marking, and retroreflective clothing, and the retroreflective article can be preferably for use in a traffic sign with excellent observation angle characteristics in particular.

Another specific application of the retroreflective article according to the present invention is light gathering prism sheeting or the like for use in a reflector for an optical sensor, or a liquid crystal display device. In the case of using the retroreflective article in a liquid crystal display device particularly, an angle between retroreflective faces can be freely adjusted, so that it is possible to freely control the extent of collecting light guided from the back surface of the sheeting.

DESCRIPTION OF REFERENCE NUMERALS a, b, c: Reflective lateral face
a1, b1, c1: Upper secondary reflective lateral face
a2, b2, c2: Lower secondary reflective lateral face
a11, a12, b11, b12, c11, c12: Plane (secondary reflective lateral face)
A, B, C, D, D1, D2, E, E1, E2, F, F1, F2, H: Apex

The invention claimed is:

1. A retroreflective article having a set of a large number of hexagonal cube corner retroreflective elements, the retroreflective article comprising:
a hexagonal cube corner retroreflective element having three quadrilateral reflective lateral faces (face a, face b, and face c), each of the quadrilateral reflective lateral faces sharing three edge lines (HD, HE, and HF) and one apex (H) with each other and being defined by six outer circumferential edges (AE, EC, CD, DB, BF, and FA), the hexagonal cube corner retroreflective element having an optical axis passing through the apex (H) and located at an equal distance from the three reflective lateral faces (face a, face b, and face c), wherein
at least one of said reflective lateral faces is divided into a pair of secondary reflective lateral faces comprising an upper secondary reflective lateral face (face a1, face b1, and/or face c1) and a lower secondary reflective lateral face (face a2, face b2, and/or face c2) partitioned by a line segment (EF, FD, and/or DE) connected by apexes (E, F, and/or D), and
the upper and lower secondary reflective lateral faces comprising the pair of secondary reflective lateral faces are not coplanar.

2. The retroreflective article according to claim 1, wherein the optical axis of the hexagonal cube corner retroreflective element is tilted at an angle ranging from 3 to 15 degrees to a perpendicular on a common plane of the retroreflective article from the apex (H) of the retroreflective element.

3. The retroreflective article according to claim 1 or 2, wherein an angle between the secondary lateral faces formed by the upper secondary reflective lateral face and the lower secondary reflective lateral face is an angle ranging from 0.008 to 0.33 degrees.

4. The retroreflective article according to claims 1 or 2, wherein a secondary lateral face angle of the secondary reflective lateral face differs from a secondary lateral face angle of a corresponding secondary reflective lateral face of an adjacent retroreflective element by an angle ranging from 0.008 to 0.33 degrees.

5. The retroreflective article according to claim 3, wherein a secondary lateral face angle of the secondary reflective lateral face differs from a secondary lateral face angle of a corresponding secondary reflective lateral face of an adjacent retroreflective element by an angle ranging from 0.008 to 0.33 degrees, and
the secondary lateral face angle is changed with a combination of at least two secondary lateral face angles at regular intervals.

6. The retroreflective article according to claim 5, wherein a face (E1-E2-F2-F1, F1-F2-D2-D1, and/or D1-D2-E2-E1) to form no cube corner is provided between the upper secondary reflective lateral face and the lower secondary reflective lateral face.

7. The retroreflective article according to claim 6, wherein the upper secondary reflective lateral faces and/or the lower secondary reflective lateral faces are further divided into at least two planes.

8. The retroreflective article according to claim 7, wherein the upper secondary reflective lateral faces and/or the lower secondary reflective lateral faces form a quadric surface.

* * * * *